United States Patent [19]
Kreimer et al.

[11] 4,046,249
[45] Sept. 6, 1977

[54] VIBRATION CONVEYOR APPARATUS HAVING CAMBERED TROUGH

[76] Inventors: Vladimir Isakovich Kreimer, ulitsa Derzhavina, 46, kv. 52; Anatoly Yakovlevich Tishkov, ulitsa Derzhavina, 19, kv. 67; Vitaly Markovich Grigoriev, ulitsa Tankovaya, 49, kv. 7; Ljudmila Ivanovna Gendlina, ulitsa Pisareva, 4, kv. 64; Leonid Vasilievich Zimonin, ulitsa Borisa Bogatkova, 247, kv. 10, all of Novosibirsk, U.S.S.R.

[21] Appl. No.: 682,635

[22] Filed: May 3, 1976

Related U.S. Application Data

[63] Continuation of Ser. No. 530,411, Dec. 6, 1974, abandoned.

[51] Int. Cl.² .................................................. B65G 27/34
[52] U.S. Cl. ...................................... 198/758; 198/771
[58] Field of Search .............. 198/595, 596, 752, 758, 198/771

[56] References Cited

U.S. PATENT DOCUMENTS

| 2,756,871 | 7/1956 | Joy ................................ 198/752 UX |
| 3,743,080 | 7/1973 | Muschoot ...................... 198/752 UX |

FOREIGN PATENT DOCUMENTS

| 711,362 | 5/1943 | Germany ...................... 198/752 UX |
| 1,189,452 | 8/1945 | Germany ...................... 198/752 UX |

*Primary Examiner*—Robert B. Reeves
*Assistant Examiner*—David A. Scherbel
*Attorney, Agent, or Firm*—Holman & Stern

[57] ABSTRACT

The apparatus is distinguished in that its feeding trough cambered in the direction from the loading end towards the unloading end thereof is arranged with its camber up so that its feeding surface is convex.

3 Claims, 3 Drawing Figures

VIBRATION CONVEYOR APPARATUS HAVING CAMBERED TROUGH

This is a continuation of application Ser. No. 530,411 filed Dec. 6, 1974, now abandoned.

BACKGROUND OF THE INVENTION

The invention relates to vibration conveyor apparatus, and in particular to the apparatus to be used for feeding granular materials along inclined channels.

More specifically, the invention relates to the feeding of granular rocks to be fed after the mining along inclined mining excavations, as well as to the feeding of any granular materials from an upper level to a lower level along special channels.

At present, it is well known that belt, scraper, plate and pendulum conveyors are used for feeding rocks along inclined mining excavations.

The disadvantage of the belt and scraper conveyors resides in their unreliable operation under the above-mentioned conditions due to a rapid wear of belts and troughs of the conveyors, as well as due to the expulsion of traction chains from the troughs.

The disadvantage of the plate and pendulum conveyors consists in a large labour consumption required for their assembly and disassembly as well as their large size which makes them operable only in the excavations having a considerable cross-sectional area, normally of at least 5 m².

It is also known to use for the above-mentioned purposes vibration conveyor apparatus comprising a vibration trough cambered in the direction from the forward loading end towards the rearward discharge end with the camber down.

This trough is provided with means for cantilevering it in a channel and is connected to a vibrator (cf. USSR Inventor's Certificate No. 275835, Cl. 81e, 51)

During the feeding, the material moves from the top down along a smoothly concave surface.

The main disadvantage of such apparatus consists in the fact that they are applicable on short lengths only, normally not exceeding 5m due to the above-mentioned concavity of the working surface of the trough.

There are also known vibration conveyor apparatus having a trough disposed axially along the flow path of the material to be fed. Among these apparatus there should be mentioned such which have the bottom portion of the trough of a convex shape with the convexity directed inwardly of the trough, probably with a view to intensifying the stirring in the trough. The camber of the bottom wall is controlled by means of hydraulic jacks serving to support the trough on the bottom of the excavation (cf. the German Federal Republic patent No. 1189452, Cl. 81e, 52).

The common disadvantage of these apparatus consists in their unreliable operation due to a rapid failure of hydraulic jacks and resilient support members taking-up heavy loads of the frame weight.

In addition, the apparatus having the trough bottom wall with the convexity directed inwardly of the trough are complicated in the manufacture and maintenance due to the intricate shape of the troughs and employment of the system of hydraulic support jacks described above.

All the above-mentioned disadvantages impair the reliability of operation of such conveyor apparatus.

There are also known vibration conveyor apparatus to be used for the above-mentioned purposes comprising a vertically triangular frame supported on the bottom of an excavation by resilient members, and a base. A vibrator is mounted within the frame. A receiving trough and a feeding trough are sequentially arranged on the inclined side of the frame along the direction of flow of the material being fed (cf. the German patent No. 711362, Cl. 81e, 51).

These apparatus are disadvantageous because of their large size and unreliable operation due to a rapid wear of the elastic members taking up heavy loads of the frame weight during the operation.

It is known to use for feeding materials in underground excavations scraper arrangements which are unreliable due to a rapid wear of ropes and unproductive when feeding materials along mining excavations of a considerable length.

OBJECTS AND SUMMARY OF THE INVENTION

The main object of the invention is to provide a vibration conveyor apparatus which is reliable and sufficiently durable in operation, can be easily installed in an underground excavation or any other channel of a small cross-sectional area (less than 5 m²), is simple in the assembly and disassembly inside the excavation or any other channel.

Among other objects of the invention are the provision of a conveyor apparatus capable of operating at any desired feeding length in an underground excavation or other channel; improvement of the throughput capacity without complicating the shape of the troughs.

Other objects and advantages of the invention will become apparent from the following description thereof.

The above objects are accomplished due to the fact that in a vibration conveyor apparatus for feeding granular material along inclined channels comprising a trough cambered in the direction from the loading end towards the unloading end adapted to be cantilevered in an inclined channel and connected to a vibrator, according to the invention, the trough is arranged with its camber up.

This shape of the feeding trough provides optimal conditions for an intensive feeding of a material therealong, as well as to the adjacent trough, where a plurality of series-installed apparatus are used.

In order to render the trough shape more stable, the bent boards of the trough are preferably interconnected by means of a tie rod. With the above-described embodiments of the apparatus, the vibrator is preferably mounted in the central portion of the trough on the underside thereof so that it does not interfere with the material being fed and ensures the most efficient transmission of oscillations to the trough.

BRIEF DESCRIPTION OF THE DRAWINGS

The invention will now be described in detail with reference to the accompanying drawings illustrating specific embodiments of the invention, in which.

DETAILED DESCRIPTION OF A PREFERRED EMBODIMENT

Figure 1:
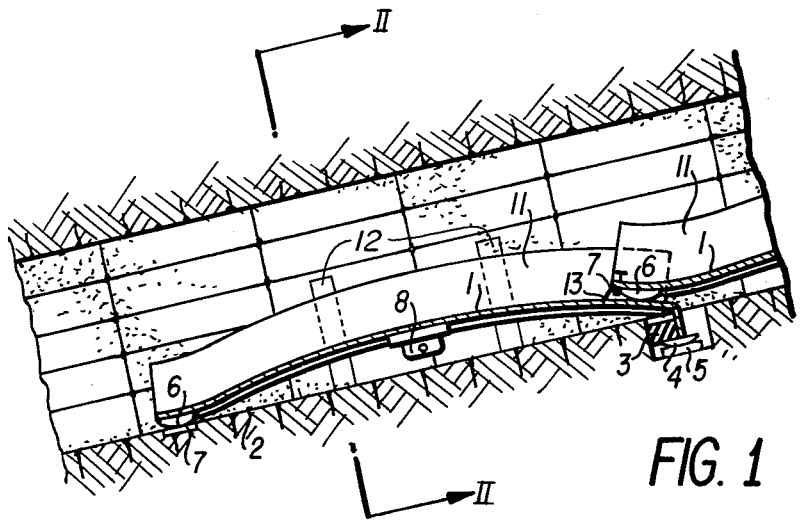
FIG. 1 shows a longitudinal section of a vibration conveyor apparatus for feeding granular materials along inclined channels, in particular in inclined underground excavations, according to the invention.

The apparatus comprises a feeding trough 1 (FIGS. 1 to 3) smoothly cambered in the direction from the forward loading end towards the rearward unloading end with its camber up. The trough is manufactured from a resilient material, e.g. steel.

The forward end of the trough 1 is cantilevered to the bottom of an excavation 2 (FIGS. 1, 2 and 3) by means of resilient members 3 (FIGS. 1 and 3) and support members 4 and 5 providing the support of the apparatus on the excavation bottom. The member 4 is secured to the trough, and the member 5 is fixed to the excavation bottom.

The rear end of the trough 1 freely rests on the excavation bottom 2 by means of replaceable support members 6 and 7 of which the member 6 is fixed to the trough 1 and the other member 7 is fixed to the excavation bottom 2.

In this embodiment, a vibrator 8 is secured to the underside of the trough 1 in the central portion thereof. The vibrator can also be mounted on the top of the trough on a mounting bracket so as not to interfere with the flow of the material being fed.

For a more stable shape of the trough 1 with its chamber up, the bent boards thereof are interconnected by means of a tie rod 9 (FIG. 3) attached to the underside of the trough by means of eyelets 10.

In order to prevent the material being fed from pouring out of the trough 1, side boards 11 (FIG. 2) may be attached to the longitudinal boards thereof, said boards 11 being kept in the bent-down position by means of bars 12 mounted in the excavation.

Figure 2:
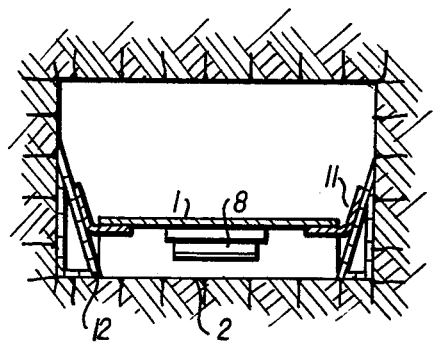
FIG. 2 shows a sectional view of the apparatus.
Figure 3:
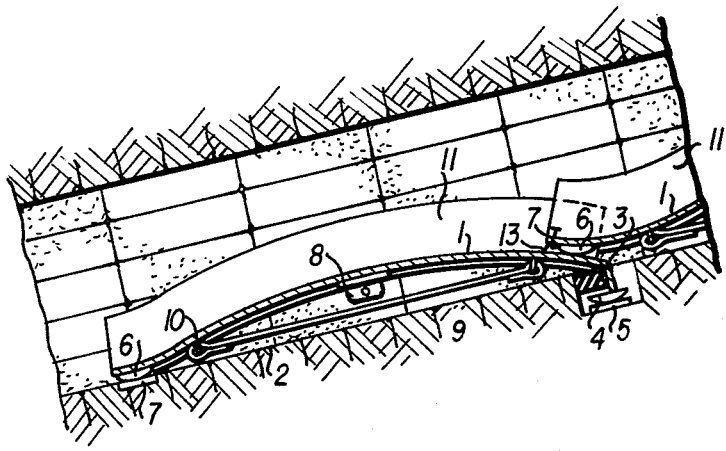
FIG. 3 shows the apparatus illustrated in FIG. 1 with the bent boards of the trough interconnected by means of a tie rod.

Depending on the length of the feeding portion, one of plurality of conveyor apparatus can be used mounted one after another as shown in the drawings. The trough of one apparatus overlaps the adjacent trough of another apparatus as shown in FIGS. 1 and 3.

The apparatus functions as follows:

Upon the energization of the vibrator 8, oscillations in the form of longitudinal and transversal elastic waves appear in the trough 1 due to the above-described manner of cantilevering the trough and its upwardly directed camber, whereby the material to be fed is caused to move. The resilient members also contribute to this effect, while the replaceable members 6 and 7 prevent the working member 1 from premature wearing-out and protect the base of the excavation 2 against damage.

Due to the above-described oscillations of the trough, the material is intensively moved from the forward end of the trough 1 to the rearward end thereof and from one trough to another so that no clogging can occur.

The apparatus according to the invention is simple and reliable in operation and simple in the manufacture. The apparatus of such type can be successfully used both on short and unlimitedly long feeding length in closed and underground inclined channels, as well as in the open channels, on trestles and the like.

What is claimed is:

1. A vibration conveyor apparatus for feeding granular materials along inclined channels comprising a flexible resiliant working member in the form of a trough having a loading end portion, a central portion, and an unloading end portion, said central portion being cambered up in the longitudinal direction from the loading end portion towards the unloading end portion, said working member being anchored in at least one point of said inclined channel; and a vibrator connected to said working member.

2. The apparatus according to claim 1, further comprising a tie rod interconnecting the ends of said central portion adjoining said loading end portion and said unloading end portion.

3. The apparatus according to claim 1, wherein the vibrator is mounted in the central portion of the trough on the underside thereof.

* * * * *